United States Patent [19]

Sonntag

[11] Patent Number: 5,744,993
[45] Date of Patent: Apr. 28, 1998

[54] READ CHANNEL FOR AT LEAST PARTIALLY OFFSETTING NONLINEAR SIGNAL EFFECTS ASSOCIATED WITH THE USE OF MAGNETO-RESISTIVE HEADS

[75] Inventor: Jeffrey Lee Sonntag, Rockland Township, Berks County, Pa.

[73] Assignee: Lucent Technologies, Inc., Murray Hill, N.J.

[21] Appl. No.: 534,524

[22] Filed: Sep. 27, 1995

[51] Int. Cl.$^6$ .................................................. H03L 5/00
[52] U.S. Cl. ...................... 327/307; 327/312; 327/317; 327/346; 360/46; 360/65; 330/9
[58] Field of Search .................................. 327/307, 309, 327/310, 312, 315, 316, 317, 318, 323, 331, 332, 346–350, 363; 330/9; 360/46, 65

[56] References Cited

U.S. PATENT DOCUMENTS

| | | | |
|---|---|---|---|
| 4,849,826 | 7/1989 | Ohta | 360/65 |
| 4,914,398 | 4/1990 | Jove et al. | 327/552 |
| 5,367,409 | 11/1994 | Ottesen et al. | 360/32 |
| 5,418,660 | 5/1995 | Sato et al. | 360/65 |
| 5,459,679 | 10/1995 | Ziperovich . | |
| 5,583,706 | 12/1996 | Dudley et al. | 360/46 |

FOREIGN PATENT DOCUMENTS

| | | | |
|---|---|---|---|
| 0 269 756 | 5/1986 | United Kingdom | G11B 20/10 |

OTHER PUBLICATIONS

R. D. Hempstead, "Thermally Induced Pulses in Magnetoresistive Heads," IBM Journal of Research & Development, Nov. 1974, vol. 18, No. 6, pp. 547–550.

Yufeng Li and Aric R. Kumaran, "The Determination Flash Temperature In Intermittent Magnetic Head/Disk Contacts Using Magnetoresistive Heads: Part I –Model and Laser Simulation," Journal of Tribology, Jan. 1993, vol. 115, pp. 170–184.

Tsividis, Yannis, Mihai Banu and John Khoury, "Continuous–Time MOSFET–C Filters in VLSI," *IEEE Transactions on Circuits and Systems*, vol. CAS–33, No. 2, Feb. 1986, pp. 125–140.

H. Suyama et al, "Thin Film MR Head for High Density Rigid Disk Drive", *IEEE Transactions On Magnetics*, vol. 24, No. 6, Nov. 1988, pp. 2612–2616.

J. Sonntag et al, "A High Speed, Low Power PRML Read Channel Device," *IEEE Transactions On Magnetics*, vol. 31, No. 2, Mar. 1995, pp. 1186–1195.

Yannis Tsividis and Paolo Antognetti, *Design of MOS VLSI Circuits for Telecommunications*, "Continuous–Time Filters," Chapter 11, pp. 334–371. Prentice–Hall, Inc. 1985, Englewood Cliffs, NJ.

H. Suyama et al, "Thin Film MR Head for High Density Rigid Disk Drive," *IEEE Transactions On Magnetics*, vol. 24, No. 6, Nov. 1988, pp. 2612–2614.

Patent Abstracts of Japan, Publication No. 07057227, Publication Date Mar. 03, 1995, "Device For Evaluation Quantum Of Non–Linear Distortion Of Reproducing Head".

T. Yamakoshi et al, "The Effect of Non–Linear MR Read-back Distortion on a PRML Channel", IEEE Translation on Magnetics in Japan, vol. 9, No. 3, May/Jun. 1994.

*Primary Examiner*—Timothy P. Callahan
*Assistant Examiner*—Kenneth B. Wells
*Attorney, Agent, or Firm*—James H. Fox

[57] ABSTRACT

Briefly, in accordance with one embodiment of the invention, a device for use in a magnetic recording read channel adapted to be coupled to a magneto-resistive (MR) read head comprises: an integrated circuit adapted so as to introduce a controllable amount of second-order nonlinearity into the magnetic recording read channel signal path to at least partially offset nonlinearity associated with use of the MR read head. Briefly, in accordance with another embodiment of the invention, a method of reducing nonlinear signal effects in a magnetic recording read channel signal path associated with use of a magneto-resistive (MR) read head comprises the step of: introducing into the read channel signal path a scalable square of the read channel signal.

7 Claims, 3 Drawing Sheets

READ CHANNEL FOR AT LEAST PARTIALLY OFFSETTING NONLINEAR SIGNAL EFFECTS ASSOCIATED WITH THE USE OF MAGNETO-RESISTIVE HEADS

RELATED APPLICATION

This patent application is related to concurrently filed U.S. patent application Ser. No. 08/534,767 entitled "Differential Amplifier Circuit For Use In A Read Channel For A Magnetic Recording System," filed Sep. 27, 1995 by Sonntag et al., assigned to the assignee of the present invention.

TECHNICAL FIELD

The present invention is related to read channels and, more particularly, to read channels adapted for use with magneto-resistive (MR) heads.

BACKGROUND OF THE INVENTION

Magneto-resistive (MR) heads or MR read heads are being used with increasing frequency in disk drives and other applications. MR read heads are described, for example, in H. Suyama, et al., "Thin Film MR Head for High Density Rigid Disk Drive," *IEEE Transactions on Magnetics*, Volume 24, No. 6, November, 1988, herein incorporated by reference. Unfortunately, such MR read heads are fundamentally nonlinear in their conversion of a substantially instantaneous magnetic field into a resistance. One approach to reduce the nonlinearity produced by the MR head is to electrically bias the read head so that it operates in the region of its response curve that most closely approximates a linear curve region. However, this approach is still disadvantageous in that it will, nonetheless, produce nonlinear signal effects due to, for example, the remaining or residual nonlinearity of the MR read head response, errors in the bias applied, or for other reasons. Therefore, a need exists for addressing the nonlinear signal effects produced by such MR read heads.

SUMMARY OF THE INVENTION

Briefly, in accordance with one embodiment of the invention, a device for use in a magnetic recording read channel adapted to be coupled to a magneto-resistive (MR) read head comprises: an integrated circuit adapted so as to introduce a controllable amount of second-order nonlinearity into the magnetic recording read channel signal path to at least partially offset nonlinearity associated with use of the MR read head.

Briefly, in accordance with another embodiment of the invention, a method of reducing nonlinear signal effects in a magnetic recording read channel signal path associated with use of a magneto-resistive (MR) read head comprises the step of: introducing into the read channel signal path a scalable square of the read channel signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Magnetic recording systems, such as disk drives, for example, employ electronic circuits to read electromagnetically stored signals, such as those stored on a disk or diskette, for example. Typically, such systems employ magnetic induction, such as described, for example, in *An Introduction to Direct Access Storage Devices*, written by Hugh M. Sierra, published by Academic Press, Inc., (1990), and herein incorporated by reference. It has become increasingly popular to employ magneto-resistive (MR) heads or MR read heads with such systems. One reason is because such read heads may provide improved signal-to-noise (S/N) ratios in comparison with other conventional types of read heads that may be employed with a read channel.

Figure 2:
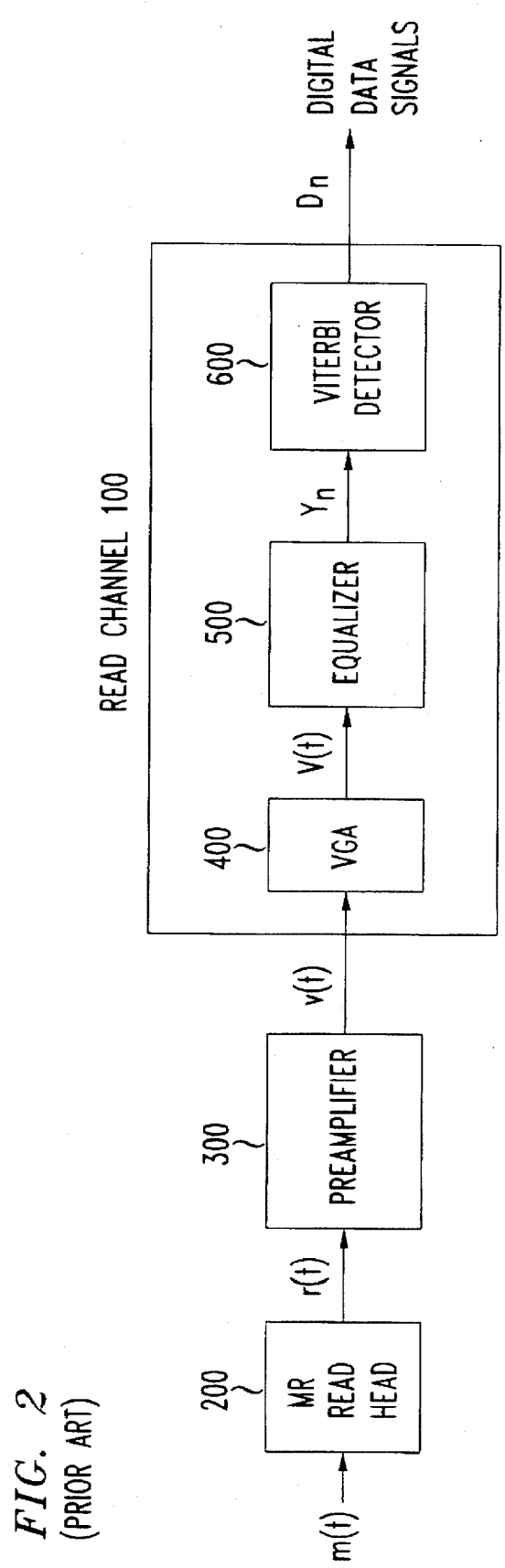
FIG. 2 is a block diagram of an implementation of a conventional magnetic recording read channel coupled to a magneto-resistive (MR) read head.

FIG. 2 is a block diagram illustrating an embodiment 100 of a conventional read channel for a magnetic recording unit, including the read channel signal path. Read channel 100 is illustrated as coupled to a MR read head 200. Of course, the components illustrated are AC coupled in a manner so as to reduce DC bias voltages. As illustrated in FIG. 2, MR read head 200 may receive a magnetic field strength signal, designated m(t) in FIG. 2. In response to this magnetic field strength signal, read head 200 may provide a signal in the form of a resistance, designated r(t) in FIG. 2. This resistance may be provided to a preamplifier 300 which produces a voltage signal, v(t), in response to resistance, r(t). As illustrated, this voltage signal may be provided to read channel 100. In this particular implementation, read channel 100 comprises a variable gain amplifier (VGA) 400, an equalizer 500, and a viterbi detector 600. It will, of course, be appreciated that alternative implementations of a read channel may be employed. For example, alternatively, a decision feedback equalizer (DFE) may be employed in the read channel. This particular configuration is provided only for purposes of illustration.

As illustrated in FIG. 2, VGA 400 receives voltage signal, v(t), and produces an amplified voltage signal, V(t). This amplified voltage signal is provided along the read channel signal path to equalizer 500, which produces an equalized signal, such as a partial response maximum likelihood signal, designated $Y_n$ in FIG. 2. The use of equalizers and partial response maximum likelihood signals in magnetic recording systems is well-known in the art, such as described in, for example, *Digital and Analog Communication Systems*, by K. Sam Shanmugam, published by John Wiley and Sons, Inc. (1979), and herein incorporated by reference. In this particular embodiment, ideal values for $Y_n$ may be +1, −1, or zero, although, again, this implementation is provided only for purposes of illustration. Equalized signal, $Y_n$, is provided along the read channel signal path to viterbi detector 600, which provides digital data signals, $D_n$. These digital data signals may take the form of digital pulses that may be processed further before being provided to a physical bus, such as for a personal computer or other system that may include a magnetic recording system. For example, sequence decoding or another form of signal processing may be employed. A partial response maximum likelihood (PRML) read channel device is described, for example, in "A High Speed, Low Power PRML Read Channel Device," by Sonntag et al., appearing in *IEEE Transactions On Magnetics*, Volume 31, No. 2, Mar. 19, 1995, herein incorporated by reference.

As is well-known, MR read heads operate to convert a substantially instantaneous magnetic field strength signal into a resistance signal. Likewise, the relationship between the resulting resistance signal and the field strength signal is nonlinear. Conventionally, an attempt is made to bias the MR read head as closely as possible to the most linear region of the MR read head response curve. Likewise, as illustrated, for example, in FIG. 2, the resulting resistance is converted to a voltage in a preamplifier in a typical implementation. For a variety of reasons, this attempt to bias the MR head may not remove enough of the nonlinear signal effects and, therefore, errors may be introduced during the process of obtaining a stored signal from the storage medium.

As an approximation, the resistance, r(t), produced by the MR read head may be described in accordance with the following relationship.

$$r(t) \text{ is proportional to } m(t) + \alpha m^2(t) \tag{1}$$

An embodiment of a read channel in accordance with the invention may approximate alpha ($\alpha$) and introduce into the read channel signal path a controllable amount of second-order nonlinearity to approximately cancel or at least partially offset the nonlinear effects associated with the use of the MR read head, as described in more detail hereinafter. Furthermore, in an embodiment of a read channel in accordance with the invention, alpha may be approximated adaptively, as explained in more detail hereinafter. Adaptive approximation may offer advantages over the conventional biasing approach at least in part because the amount of nonlinear distortion associated with use of the MR read head may be difficult to predict in advance of actual system operation.

Figure 1:
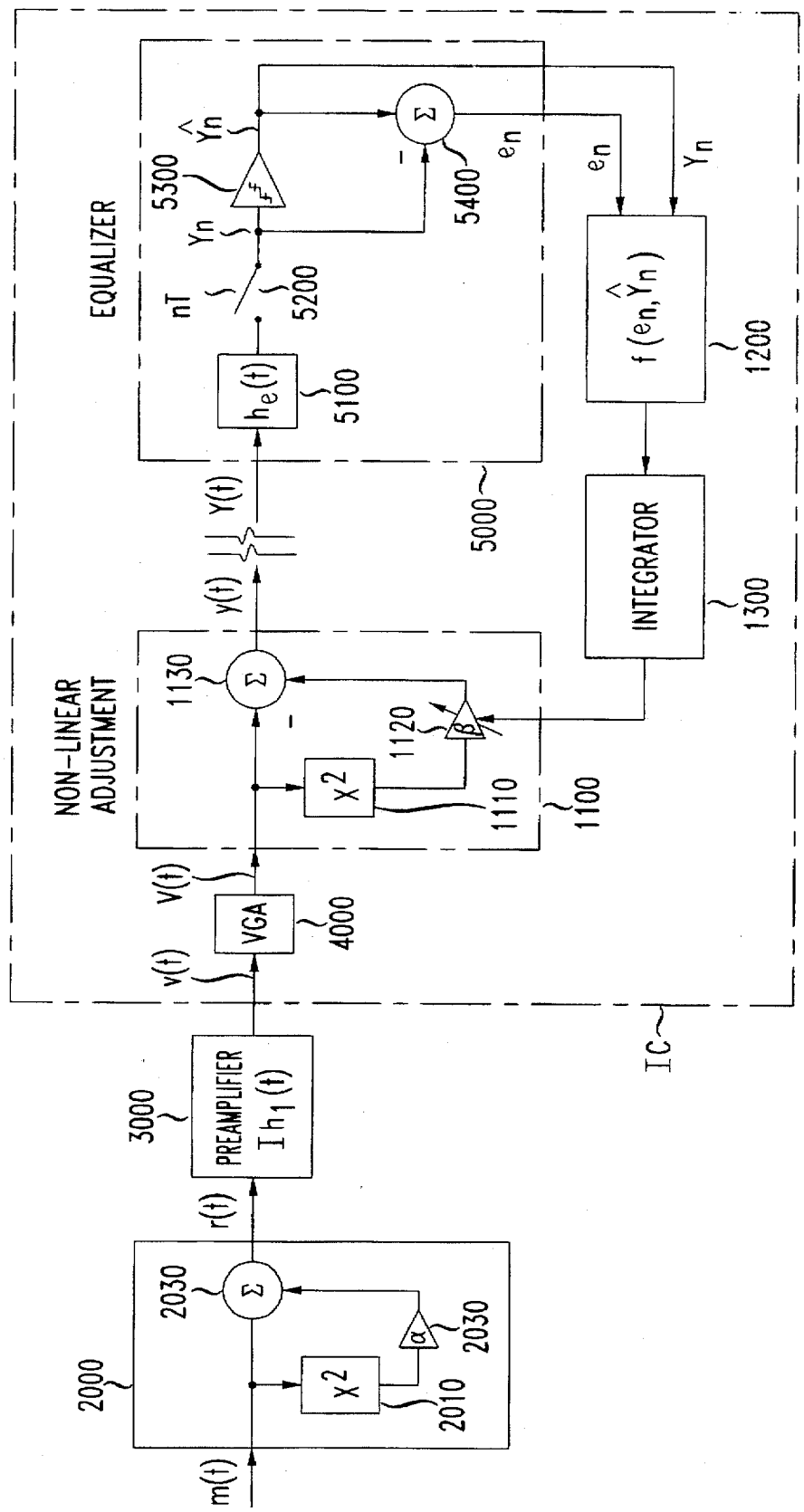
FIG. 1 is a block diagram illustrating one embodiment of a read channel in accordance with the invention.

One embodiment 1000 of a read channel in accordance with the invention is illustrated in FIG. 1. A MR read head 2000 is illustrated, although, as shown, head 2000 in FIG. 1 is based on the approximation of expression (1) above. It will, of course, be appreciated that this approximate description of the relationship between the magnetic field strength and the resistance is only to a second order. Likewise, a preamplifier 3000 is illustrated having a transfer function, $Ih_1(t)$. Where preamplifier 3000 is relatively wideband, such as higher than the Nyquist rate for the analog signal received, the transfer function for the preamplifier may be approximated as a scale factor and/or a substantially constant delay. Thus, the preamplifier approximately preserves the magnitude and phase relationship of the signal received from the MR read head so that an adjustment may be introduced after the preamplifier, as illustrated in FIG. 1 for this particular embodiment. Of course, again, it is understood that the coupling between these components is AC coupling in a manner so as to reduce or remove DC bias voltages.

As illustrated in FIG. 1, read channel 1000 includes a variable gain amplifier (VGA) 4000 and a nonlinear adjustment 1100. Likewise, as illustrated, nonlinear adjustment 1100 is adapted so as to introduce a controllable amount of nonlinearity into the magnetic recording read channel signal path, in this particular embodiment as a square of the read channel signal scaled by a factor beta ($\beta$) and introduced prior to equalizer 5000. In this embodiment, it is desirable to introduce this adjustment at this point in the read channel signal path at least in part because, after the VGA, the relative stability of the voltage signal levels makes processing more convenient. Likewise, introducing an adjustment prior to equalization avoids the complications of equalizer signal processing that may affect the relative magnitude and phase of the fundamental and harmonic components of the read channel signal, although the invention is not limited in scope to introducing the adjustment at this particular point in the read channel signal path.

As illustrated in FIG. 1, a nonlinear adjustment of the form $$V(t) [1-\beta V(t)] \tag{2}$$

is realized by introducing the square of the read channel signal with an adjustable gain, $\beta$. This nonlinear adjustment is consistent with expression (1) describing the approximate relationship between the magnetic field strength signal, m(t), and resistance signal, r(t), although the square of the read channel signal is introduced in a manner so as to at least partially offset the nonlinearity associated with use of the MR read head. Likewise, to obtain expression (1), it is assumed that constant bias voltage signals are significantly reduced by AC coupling and that signals associated with higher order terms above second-order may be ignored.

Based on expression (2) above, a desirable value of beta ($\beta$) will depend, at least in part, on the peak voltage amplitude of V(t). Thus, again, introduction after the variable gain amplifier (VGA), but prior to equalization, although not required, provides convenience. As illustrated in FIG. 1, and as will be explained in more detail hereinafter, the value of $\beta$ is adjustable or controllable, at least in part, based on signals produced by equalizer 5000. Nonetheless, as illustrated in FIG. 1, nonlinear adjustment 1100 may introduce a square of the read channel signal into the read channel signal path that at least partially offsets or even approximately cancels the second-order nonlinearity associated with use of the MR read head.

Ignoring higher order terms, the output signal, y(t), of nonlinear adjustment 1100 may be approximated by the following equation.

$$y(t)=m(t)+(\alpha-\beta)m^2(t)-2\alpha\beta m^3(t)-\alpha^3\beta m^4(t) \tag{3}$$

As an analysis of equation (3) above reveals, for $\alpha$ equals $\beta$, the $m^2(t)$ term is cancelled. Furthermore, the remaining higher order terms are much smaller than the initial distortion and, therefore, may essentially be ignored. Due to the effects of the equalizer on the read channel signal, it would be difficult to introduce a nonlinear adjustment into the read channel signal path after the equalizer or the slicer; nonetheless, distortion detection may still be performed in the read channel signal path after the equalizer. The error signal generated by the equalizer may conveniently be employed to perform this detection. Ignoring high order terms, the error signal, $e_n$, produced by equalizer 5000, assuming gain, offset, and equalizer adjustments have been performed properly, may be approximated by the following equation.

$$e_n = \text{noise}_n + (\alpha - \beta)[m^2(t) * h_e(t)]|_{t=nT} \tag{4}$$

where $h_e(t)$ is the transfer function for the equalizer and $\text{noise}_n$ is the substantially instantaneous noise in the read channel signal evaluated, in this embodiment, at analog signal sampler 5200 in the read channel signal path at sample time nT, where T is the sample period and n is a positive integer.

Based at least in part on equation (4), an appropriate value for β may be adaptively adjusted using feedback control if a nonlinear distortion (NLD) metric may be developed which, for example, is related to (α–β) such that the NLD metric has a mean value of zero when α–β approximately equals zero, a positive mean value when α–β is greater than zero, and a negative mean value when (α–β) is less than zero. For example, if such a metric is integrated and used to control or adjust the value of β so that β is a monotonic function of the integral, then employing feedback control should ensure that β approximately equals α, which is the desired result.

Although a number of different possible metrics may be employed within the scope of the present invention, as previously indicated, a convenient metric for this particular embodiment may be based, at least in part, upon the slicer output signal and error signal produced by equalizer 5000. This approach effectively utilizes the processing performed by the equalizer in obtaining $e_n$ and $\hat{Y}_n$ to additionally at least partially offset nonlinear signal effects in the read channel signal path associated with use of the MR read head, although the invention is not limited in scope in this respect.

One such metric may be employed in accordance with the following equation:

$$NLD_n = P_n e_n, \quad (5)$$

where $$P_n = P(\hat{Y}_n) = \begin{cases} 1, & \text{for } |\hat{Y}_n| = 1 \\ -1, & \text{for } \hat{Y}_n = 0, \end{cases}$$

although, again, the scope of the invention is not limited in this respect.

One advantage of this particular metric is that it may utilize an existing equalizer configuration rather than introducing a significant amount of additional signal processing, making practical application more convenient than other alternative implementations, such as in software. Likewise, although the invention is not restricted in scope to a hardware embodiment, nonetheless, in environments in which relatively high processing speed is desirable, the ability to implement the nonlinear adjustment in hardware provides advantages over other implementations.

The expected value of this metric demonstrates that it should produce a value related to α–β, as desired.

$$E(NLD_n) = E(P_n \text{noise}_n) + E(P_n(\alpha-\beta)[m^2(t)*h_e(t)]|_{t=nT}) \quad (6)$$

$P_n$ is not correlated with the noise, however, $P_n$ is correlated with $m^2(t)$. More specifically, $P_n$ has been selected in a manner so that it roughly corresponds to $f(x)=x^2$. Therefore, the expected value produces the following result.

$$(\alpha-\beta)E(P_n[m^2(t)*h_e(t)]|_{t=nT}) \quad (7)$$

FIG. 1 illustrates an embodiment of a read channel in accordance with the invention to implement a metric, such as the metric previously described, although the invention is not restricted in scope in this respect. As illustrated in FIG. 1, a processed version of the nonlinearly adjusted signal, y(t), is provided to equalizer 5000, designated Y(t) in FIG. 2. The wavy lines in FIG. 1 illustrate that additional processing or circuitry may couple these two points in the read channel signal path. Of course, alternatively, these points may be connected without intermediate processing or circuitry. Equalizer 5000 includes a filter 5100 and an analog signal sampler 5200. Sampler 5200 produces discrete signal samples, $Y_n$, which may be provided for further processing along the read channel, such as by a viterbi detector (not shown). Likewise, the discrete signal samples are provided to a slicer 5300 which produces error signal, $e_n$. In one embodiment, slicer 5300 may comprise multiple comparators (not shown) coupled in a comparator configuration. At node 5400, a comparison of the output signal of the slicer with the discrete signal sample is performed. Error signal, $e_n$, and slicer output signal, $\hat{Y}_n$, are then provided as feedback signals to metric block 1200. As illustrated in FIG. 1, metric block 1200 performs the metric and block 1300 integrates the resulting output signal produced by block 1200. Likewise, integrator 1300 provides an output signal to an element 1120 which adjusts β, the scale factor for the square of the read channel signal, in response to the output signal provided by integrator 1200.

One advantage of employing the metric previously described in this particular embodiment is that the resulting feedback is relatively insensitive to gain and/or offset errors of the read channel signal. For example, it may be demonstrated that for an integral of the previously described metric, gain errors or offset error approximately average out. This is desirable because it indicates that for an embodiment of a read channel in accordance with the invention that may include other feedback control mechanisms, the feedback control previously described should be relative independent of the feedback control that may be employed for gain, and/or offset error adjustment.

Although the embodiment illustrated in FIG. 1 comprises a sampled data system, the invention is not limited in scope in this respect. For example, an all-digital circuit or all-analog circuit implementation may be employed. Likewise, although this particular embodiment illustrates an equalizer and viterbi detector implementation, alternatively, a decision feedback equalizer (DFE) implementation, for example, may be employed. Likewise, although a PR-IV signaling and maximum likelihood detection embodiment is described, the invention is not restricted in scope to a PR-IV implementation.

Figure 4:
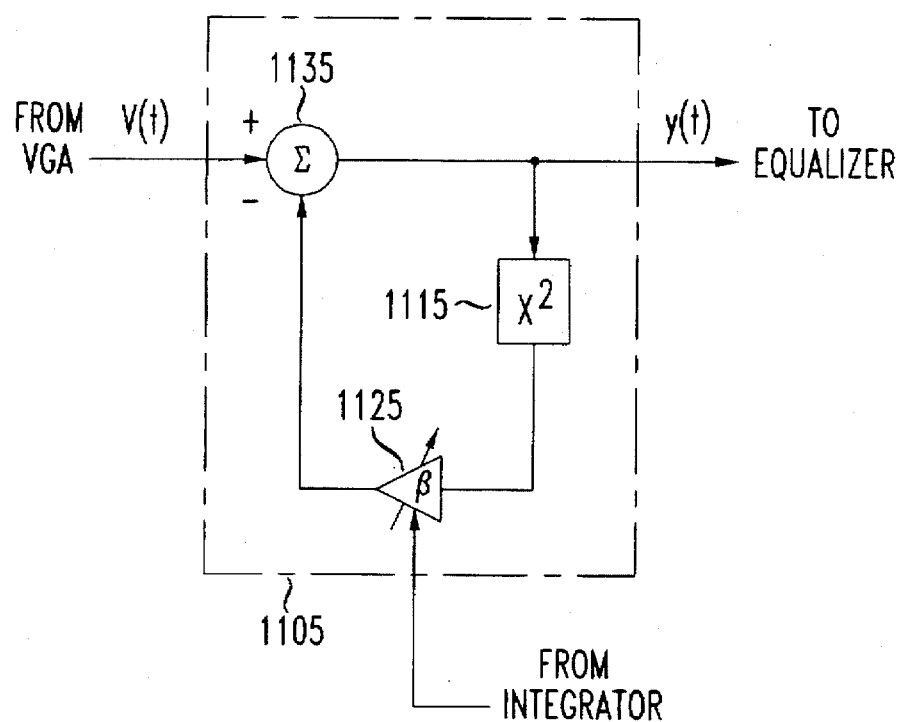
FIG. 4 is a block diagram illustrating an embodiment of a nonlinear adjustment that may be employed in an embodiment of a read channel in accordance with the invention.

FIG. 4 is a block diagram illustrating a portion of another embodiment of a read channel in accordance with the invention. FIG. 4 illustrates an alternative embodiment 1105 of a nonlinear adjustment. Whereas FIG. 1 illustrates an embodiment of a feedforward nonlinear adjustment, FIG. 4 illustrates an embodiment of a feedback nonlinear adjustment. Depending upon the particular implementation, both approaches have associated advantages and disadvantages and the invention is not limited in scope to either approach. For example, it may be demonstrated that a feedback signal path approach may ideally provide cancellation of higher order terms beyond the second-order term. However, a feedforward signal path approach may exhibit better bandwidth at least in part because feedback may introduce an additional time delay in the system. Thus, either embodiment may prove desirable in the appropriate environment.

As illustrated in FIG. 1, read channel 1000, including nonlinear adjustment 1100, may be embodied in or on an integrated circuit (IC) or other device, although the invention is not limited in scope in this respect. For example, a differential amplifier circuit, such as described in aforementioned U.S. patent application Ser. No. 08/534,767, may be employed to implement nonlinear adjustment 1100, although, again, the invention is not limited in scope in this respect. As described in the aforementioned patent application, a differential amplifier may be coupled in a circuit configuration so that a differential output voltage signal of the differential amplifier circuit includes a scalable square of the differential input voltage signal applied to the differential amplifier circuit. Furthermore, the square of the differential output voltage signal may be scaled by a variety of means, such as by adjusting a control voltage, adjusting resistor values or adjusting an amplifier gain, to name only a few of the possible approaches. Such an embodiment is convenient in that a nonlinear adjustment may be implemented conveniently in an integrated circuit using conventional electronic circuit components, such as a differential amplifier, which may be coupled in a circuit configuration so as to implement the desired nonlinear adjustment.

Figure 3:
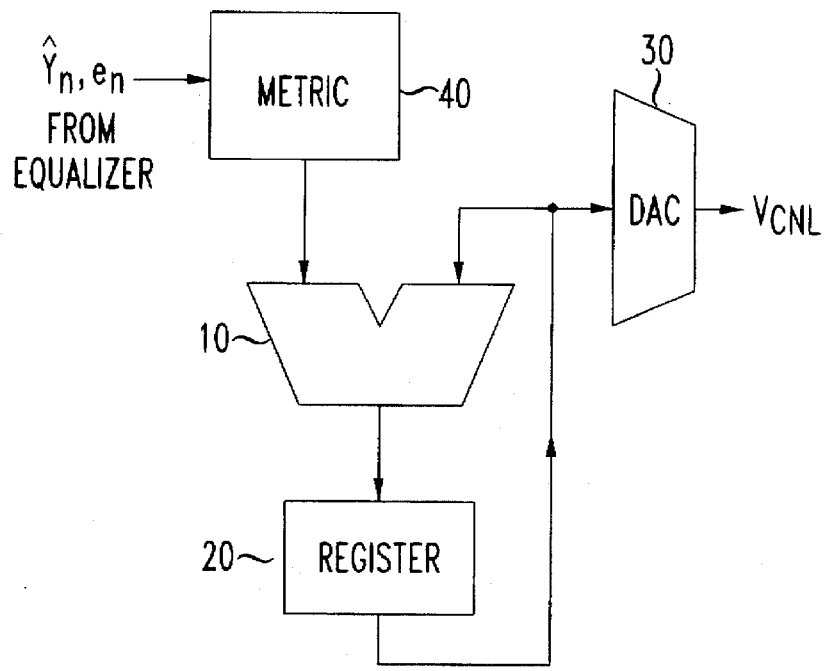
FIG. 3 is a block diagram illustrating an embodiment of a binary digital signal processor that may be employed in an embodiment of a read channel in accordance with the invention.

Likewise, FIG. 3 is a block diagram illustrating an embodiment of a binary digital signal processor for implementing feedback control in an embodiment of a read channel in accordance with the invention, as previously described, although the invention is not restricted in scope to this particular embodiment. FIG. 3 illustrates only one particular embodiment and the invention is not restricted in scope to this particular embodiment for the feedback control. Nonetheless, as illustrated, $\hat{Y}_n$ and $e_n$ may be obtained from the equalizer, such as equalizer 5000. FIG. 3 illustrates a block 40 for implementing a metric, such as in accordance with equation (5). This metric may be implemented in a conventional manner using binary digital circuitry, for example; although, the circuitry is not explicitly illustrated in FIG. 3. As illustrated, the result of this processing in accordance with a metric may be provided to an adder 10 via one of two input ports. Adder 10 is coupled in a feedback configuration so as to implement discrete integration. Thus, as illustrated in FIG. 3, the output signal produced by adder 10 is provided to a register 20 and the binary digital signal contained or stored by register 20 is fed back to the other input port of adder 10 and, likewise, is provided to a digital-to-analog converter (DAC) 30. DAC 30, therefore, may provide an analog signal, designated $V_{CNL}$ in FIG. 3, to a nonlinear adjustment, such as 1100 illustrated in FIG. 1. For example, although the invention is not limited in scope in this respect, this analog signal may be provided as a voltage control signal to a differential amplifier circuit, such as described in aforementioned concurrently filed patent application Ser. No. 08/534,767.

A device for use in the magnetic recording read channel coupled to a magneto-resistive (MR) read head, such as embodiment 1000, may be operated in accordance with the following method. A scalable square of the read channel signal may be introduced into the read channel signal path. For example, nonlinear adjustment 1100 of FIG. 1 is a block diagram illustrating a technique for performing this processing step. Any one of a number of circuit embodiments may be employed to perform this nonlinear adjustment, such as, for example, the differential amplifier circuit described in aforementioned concurrently filed U.S. patent application Ser. No. 08/534,767, although, of course, the invention is not limited in scope in this respect. Likewise, the scale factor for the square of the read channel signal may be adjusted so as to at least partially offset the nonlinear signal effects in the read channel signal path associated with use of the MR read head. Likewise, the adjustment may be performed adaptively, as previously described. Again, any one of a number of techniques may be employed to perform this adaptive adjustment step. For example, as illustrated by the embodiment shown in FIG. 1, slicer output signal, $\hat{Y}_n$, and error signal, $e_n$, produced by an equalizer, such as equalizer 5000 in FIG. 1, may be employed to implement the NLD metric previously described. Likewise, the signals produced by the equalizer may be processed in accordance with this metric and integrated, such as by the embodiment of a binary digital signal processor illustrated in FIG. 3. The digital signal produced may be provided to a DAC, such as DAC 30 illustrated in FIG. 3, and this analog signal may be used to perform the adaptive adjustment previously described.

While only certain features of the invention have been illustrated and described herein, many modifications, substitutions, changes or equivalents will now occur to those skilled in the art. It is, therefore, to be understood that the appended claims are intended to cover all such modifications and changes as fall within the true spirit of the invention.

The invention claimed is:

1. An integrated circuit for use in a magnetic recording read channel signal path that includes a magneto-resistive (MR) read head, said integrated circuit comprising a variable gain amplifier (VGA) followed by a nonlinear adjustment for introducing a controllable amount of second-order nonlinearity into the magnetic recording read channel signal path;

wherein said integrated circuit further includes an equalizer coupled in the magnetic recording read channel signal path after said nonlinear adjustment, and wherein said equalizer provides an error signal ($e_n$) and a slicer output signal ($Y_n$), whereby said nonlinear adjustment adjusts the amount of second-order nonlinearity in response to a control signal based at least in part on the error signal and the slicer output signal produced by said equalizer.

2. The integrated circuit of claim 1 wherein said control signal is based at least in part on an integration of a discrete process, the discrete process being in accordance with the following relationships:

$$f(e_n, \hat{Y}_n) = P_n e_n,$$

where $$P_n = P(\hat{Y}_n) = \begin{cases} 1, & \text{for } |\hat{Y}_n| = 1 \\ -1, & \text{for } \hat{Y}_n = 0. \end{cases}$$

3. A method of reducing the non-linear signal effects in a magnetic recording read channel signal path associated with the use of a magneto-resistive (MR) read head, said method comprising the step of:

introducing into the read channel signal path a scaleable square of the read channel signal, and adjusting the scaleable square of the read channel signal so as to at least partially offset the non-linear signal effect in the read channel signal path associated with the use of the MR read head, wherein said adjusting is based at least in part on an error signal ($e_n$) produced by an equalizer in the read channel signal path.

4. The method of claim 3 wherein the step of adjusting the scale factor based at least in part on the error signal includes adjusting the scale factor based at least in part on the error signal and a slicer output signal ($Y_n$) produced by the equalizer.

5. The method of claim 4 wherein the step of adjusting the scale factor based at least in part on the error signal and the slicer output signal produced by the equalizer comprises adjusting the scale factor based at least in part on an integration of a discreet process, the discrete process being in accordance with the following relationships:

$$f(e_n, \hat{Y}_n) = P_n e_n,$$

where $$P_n = P(\hat{Y}_n) = \begin{cases} 1, & \text{for } |\hat{Y}_n| = 1 \\ -1, & \text{for } \hat{Y}_n = 0. \end{cases}$$

6. The method of claim 5 wherein the step of introducing a scaleable square of the read channel signal into the read channel signal path comprises introducing the scaleable square via a feedforward signal path.

7. The method of claim 5 wherein the step of introducing a scaleable square of the read channel signal into the read channel signal path comprises introducing the scaleable square via a feedback signal path.

* * * * *

UNITED STATES PATENT AND TRADEMARK OFFICE
CERTIFICATE OF CORRECTION

PATENT NO.   : 5,744,993
DATED        : April 28, 1998
INVENTOR(S)  : J.L. Sonntag It is certified that error appears in the above-identified patent and that said Letters Patent is hereby corrected as shown below:

Column 4,
Line 43, please replace equation 3 with the following:
-- $y(t) = m(t) + (\alpha - \beta)m^2(t) - 2\alpha\beta m^3(t) - \alpha^2 \beta m^4(t)$ --.

Signed and Sealed this

Sixteenth Day of December, 2003

JAMES E. ROGAN
*Director of the United States Patent and Trademark Office*